United States Patent
Liu

(10) Patent No.: US 9,857,650 B2
(45) Date of Patent: Jan. 2, 2018

(54) ARRAY SUBSTRATE AND LIQUID CRYSTAL DISPLAY PANEL INCLUDING THE SAME

(71) Applicant: Shenzhen China Star Optoelectronics Technology Co., Ltd., Shenzhen, Guangdong (CN)

(72) Inventor: Huan Liu, Guangdong (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 193 days.

(21) Appl. No.: 14/783,818

(22) PCT Filed: Sep. 11, 2015

(86) PCT No.: PCT/CN2015/089430
§ 371 (c)(1),
(2) Date: Oct. 9, 2015

(87) PCT Pub. No.: WO2017/031793
PCT Pub. Date: Mar. 2, 2017

(65) Prior Publication Data
US 2017/0146875 A1    May 25, 2017

(30) Foreign Application Priority Data

Aug. 24, 2015 (CN) .......................... 2015 1 0524755

(51) Int. Cl.
*G02F 1/1362* (2006.01)
*G02F 1/1368* (2006.01)
*G02F 1/1343* (2006.01)

(52) U.S. Cl.
CPC ...... *G02F 1/136286* (2013.01); *G02F 1/1368* (2013.01); *G02F 1/13439* (2013.01); *G02F 1/13624* (2013.01); *G02F 1/134309* (2013.01); *G02F 1/136213* (2013.01); *G02F 2001/134345* (2013.01); *G02F 2201/40* (2013.01)

(58) Field of Classification Search
CPC ................. G02F 1/13624; G02F 2001/134345
See application file for complete search history.

(56) References Cited

FOREIGN PATENT DOCUMENTS

CN            103728800 A  *  4/2014  ....... G02F 1/136286

* cited by examiner

*Primary Examiner* — Kendrick Hsu
(74) *Attorney, Agent, or Firm* — Andrew C. Cheng

(57) ABSTRACT

The present invention teaches an array substrate and a liquid crystal (LCD) panel including the array substrate. The array substrate contains a substrate, a number of scan lines, a number of data lines, and a number of common scan lines. The scan lines and the common scan lines are alternately interleaved with the data lines on the substrate so as to form a number of pixel units. Each pixel unit contains a main pixel unit and a sub pixel unit. The sub pixel units from two neighboring pixel units share a common scan line which drives the two sub pixel units simultaneously. As such, the number of common scan lines is reduced, thereby enhancing pixel aperture ratio.

20 Claims, 2 Drawing Sheets

ARRAY SUBSTRATE AND LIQUID CRYSTAL DISPLAY PANEL INCLUDING THE SAME

BACKGROUND OF THE INVENTION

1. Field of the Invention

The present invention generally relates to display technologies, and particularly relates to an array substrate and a liquid crystal display (LCD) panel including the array substrate.

2. The Related Arts

Existing vertical alignment (VA) LCD devices usually have each pixel divided into a main region and a sub region, and the pixel voltage for the sub region is lower than that of the main region so that liquid crystal molecules in the sub region and main region tilt differently, thereby enhancing color shift under large viewing angles.

To achieve a lower pixel voltage in the sub region than in the main region, existing approach relies on the configuration of a common scan line through each pixel. However, the common scan line takes up the aperture ratio of each pixel, adversely affecting the penetration of the LCD device.

SUMMARY OF THE INVENTION

The present invention teaches an array substrate and a liquid crystal display panel including the array substrate where the number of common scan lines is reduced so as to enhance pixel aperture ratio.

The array substrate contains a substrate, a number of scan lines, data lines, and common scan lines. The scan lines and the common scan lines are interleaved with the data lines on the substrate to form a number of pixel units. Each pixel unit contains a main pixel unit, a sub pixel unit, and a share capacitor. For each pair of neighboring pixel units, namely a Nth pixel unit and a (N+1)th pixel unit, across a common scan line, namely a Mth common scan line, the Nth and (N+1)th pixel units are arranged along and to a side of a data line, namely a Nth data line, the Nth pixel unit is located between a Nth scan line and the Mth common scan line; the (N+1)th pixel unit is located between the Mth common scan line and a (N+1)th scan line. Their two sub pixel units share the Mth common scan line which drives the two sub pixel units simultaneously. The Mth common scan line between the Nth pixel unit and the (N+1)th pixel unit is connected to a (N+n)th scan line where n is an integer greater than or equal to 2, M is an integer greater than or equal to 1, and M=(N+1)/2.

The array substrate further contains a number of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

The present invention teaches another array substrate, which contains a substrate, a number of scan lines, a number of data lines, and a number of common scan lines. The scan lines and the common scan lines are interleaved with the data lines on the substrate to form a number of pixel units. Each pixel unit contains a main pixel unit and a sub pixel unit. For each pair of neighboring pixel units across a common scan line, their two sub pixel units share the common scan line which drives the two sub pixel units simultaneously.

Each pair of neighboring pixel units is arranged along and to a side of a data line, and each pixel unit further contains a share capacitor.

For each pair of neighboring pixel units, namely a Nth pixel unit and a (N+1)th pixel unit across a Mth common scan line, the Nth pixel unit is located between a Nth scan line and the Mth common scan line, and the (N+1)th pixel unit is located between the Mth common scan line and a (N+1)th scan line.

The array substrate further contains a number of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

The Mth common scan line between the Nth pixel unit and the (N+1)th pixel unit is connected to a (N+n)th scan line where n is an integer greater than or equal to 2, M is an integer greater than or equal to 1, and M=(N+1)/2.

Alternatively, the Mth common scan line between the Nth pixel unit and the (N+1)th pixel unit is connected to a (N+2)th scan line.

When a Nth scan line is turned on, and a (N+1)th scan line and a (N+2)th scan line are turned off, a first TFT and a second TFT are conducted; a Nth data line charges a Nth main pixel unit and a Nth sub pixel unit. When the (N+1)th scan line is turned on, and the Nth scan line and the (N+2)th scan line are turned off, a fourth TFT and a fifth TFT are conducted, and a (N+1)th data line charges a (N+1)th main pixel unit and a (N+1)th sub pixel unit.

When a (N+2)th scan line is turned off, and a Nth scan line and a (N+1)th scan line are turned off, a third TFT and a sixth TFT are conducted, a Nth sub pixel unit is connected to a Mth share capacitor; a (N+1) sub pixel unit is connected to the Mth share capacitor so as to reduce the voltage of the Nth and (N+1)th sub pixel units.

Each pixel unit pixel has Indium Tin Oxide (ITO) electrodes.

The present invention also teaches a liquid crystal display panel containing an array substrate. The array substrate contains a substrate, a number of scan lines, a number of data lines, and a number of common scan lines. The scan lines and the common scan lines are interleaved with the data lines on the substrate to form a number of pixel units.

Each pixel unit contains a main pixel unit and a sub pixel unit. For each pair of neighboring pixel units across a common scan line, their two sub pixel units share the common scan line which drives the two sub pixel units simultaneously.

Each pair of neighboring pixel units is arranged along and to a side of a data line, and each pixel unit further contains a share capacitor.

For each pair of neighboring pixel units, namely a Nth pixel unit and a (N+1)th pixel unit across a Mth common scan line, the Nth pixel unit is located between a Nth scan line and the Mth common scan line, and the (N+1)th pixel unit is located between the Mth common scan line and a (N+1)th scan line.

The array substrate further contains a number of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

The Mth common scan line between the Nth pixel unit and the (N+1)th pixel unit is connected to a (N+n)th scan line where n is an integer greater than or equal to 2, M is an integer greater than or equal to 1, and M=(N+1)/2.

Alternatively, the Mth common scan line between the Nth pixel unit and the (N+1)th pixel unit is connected to a (N+2)th scan line.

When a Nth scan line is turned on, and a (N+1)th scan line and a (N+2)th scan line are turned off, a first TFT and a second TFT are conducted; a Nth data line charges a Nth main pixel unit and a Nth sub pixel unit. When the (N+1)th scan line is turned on, and the Nth scan line and the (N+2)th scan line are turned off, a fourth TFT and a fifth TFT are conducted, and a (N+1)th data line charges a (N+1)th main pixel unit and a (N+1)th sub pixel unit.

When a (N+2)th scan line is turned off, and a Nth scan line and a (N+1)th scan line are turned off, a third TFT and a sixth TFT are conducted, a Nth sub pixel unit is connected to a Mth share capacitor; a (N+1) sub pixel unit is connected to the Mth share capacitor so as to reduce the voltage of the Nth and (N+1)th sub pixel units.

Each pixel unit pixel has Indium Tin Oxide (ITO) electrodes.

By configuring a substrate, a number of scan lines, data lines, and common scan lines, the scan lines and the common scan lines are alternately interleaved with the data lines on the substrate to form a number of pixel units, and each pixel unit contains a main pixel unit and a sub pixel unit. The sub pixel units from two neighboring pixel units share a common scan line which drives the two sub pixel units simultaneously. As such, the number of common scan lines is reduced, thereby enhancing pixel aperture ratio.

BRIEF DESCRIPTION OF THE DRAWINGS

To make the technical solution of the embodiments according to the present invention, a brief description of the drawings that are necessary for the illustration of the embodiments will be given as follows. Apparently, the drawings described below show only example embodiments of the present invention and for those having ordinary skills in the art, other drawings may be easily obtained from these drawings without paying any creative effort. In the drawings.

DETAILED DESCRIPTION OF THE PREFERRED EMBODIMENTS

Figure 1:
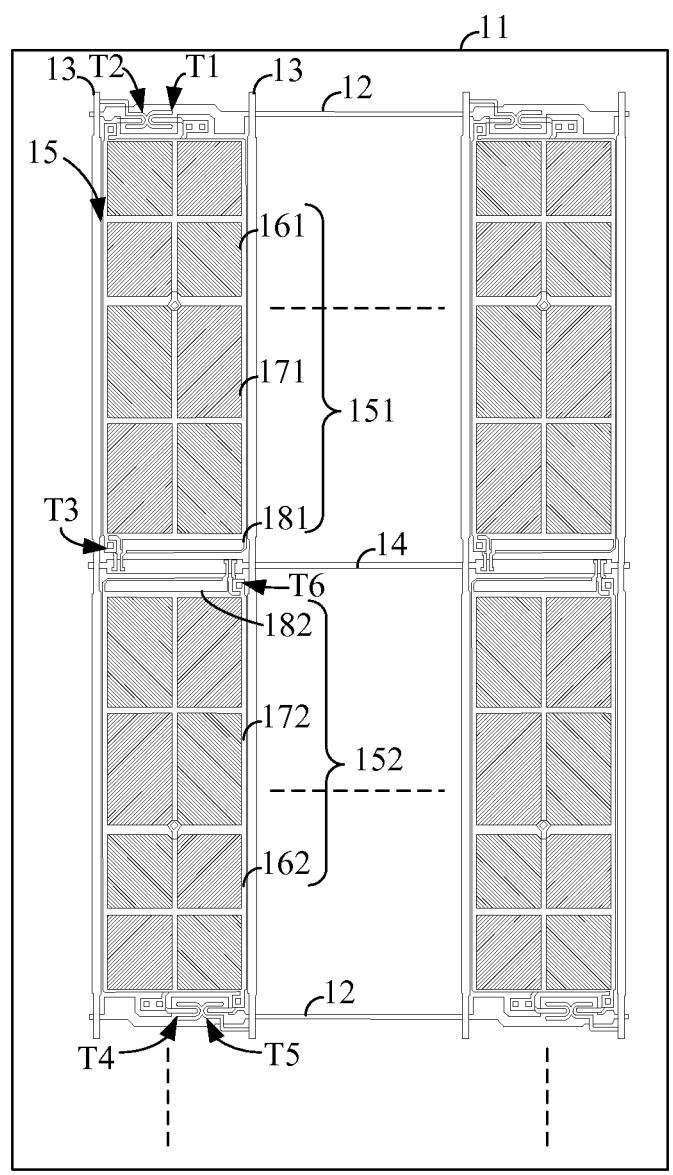
FIG. 1 is a schematic diagram showing an array substrate according to an embodiment of the present invention.

FIG. 1 is a schematic diagram showing an array substrate 10 according to an embodiment of the present invention. As illustrated, the array substrate 10 contains a substrate 11, a number of scan lines 12, a number of data lines 13, and a number of common scan lines 14.

The scan lines 12 and the common scan lines 14 are alternately interleaved with the data lines 13 on the substrate 11 to form a number of pixel units 15. Each pixel unit 15 contains a main pixel unit and a sub pixel unit. For each pair of neighboring pixel units 15 across a common scan line 14, one pixel unit 15 is turned 180 degree so that their sub pixel units are equally adjacent to the common scan line 14. The two sub pixel units share the common scan line 14, and the common scan line 14 drives the two sub pixel units simultaneously.

As shown in FIG. 1, each pair of neighboring pixel units 15, namely a Nth pixel unit 151 and a (N+1)th pixel unit 152, is arranged along and to a side of a data line 13. In other words, the Nth and (N+1)th pixel units 151 and 152 are on neighboring rows with a common scan line 14 in between. The Nth pixel unit 151 contains a Nth main pixel unit 161, a Nth sub pixel unit 171, and a Nth share capacitor 181. The (N+1)th pixel unit 152 contains a (N+1)th main pixel unit 162, a (N+1)th sub pixel unit 172, and a (N+1)th share capacitor 182. In contrast to a conventional pixel unit, the (N+1)th pixel unit 152 is turned 180 degrees so that the Nth sub pixel area 171 and the (N+1)th sub pixel unit 172 are equally adjacent to the common scan line 14. N is an integer greater than or equal to 1.

The Nth pixel unit 151 is located between a Nth scan line 12 and a Mth common scan line 14. The (N+1)th pixel unit 152 is located between the Mth common scan line 14 and a (N+1)th scan line 12. The array substrate 10 further contains first thin film transistors (TFTs) T1, second TFTs T2, third TFTs T3, fourth TFTs T4, fifth TFTs T5, and sixth TFTs T6.

Each first TFT T1 has its gate connected to a Nth scan line 12, its source connected to a Nth data line 13, and its drain connected to a Nth main pixel unit; each second TFT T2 has its gate connected to the Nth scan line 12, its source connected to the Nth data line 13, and its drain connected to a Nth sub pixel unit 171. Each third TFT T3 has its gate connected a Mth common scan line 14, its source connected to the Nth sub pixel unit 171, and its drain connected to a Nth share capacitor 181. Each fourth TFT T4 has its gate connected to a (N+1)th scan line 12, its source connected to the Nth data line 13, and its drain connected to a (N+1)th main pixel unit 162. Each fifth TFT T5 has its gate connected to the (N+1)th scan line 12, its source connected to the Nth data line 13, and its drain connected to a (N+1)th sub pixel unit 172. Each sixth TFT T6 has its gate connected to the Mth common scan line 14, its source connected to the (N+1)th sub pixel unit 172, and its drain connected to a (N+1)th share capacitor 182.

Figure 2:
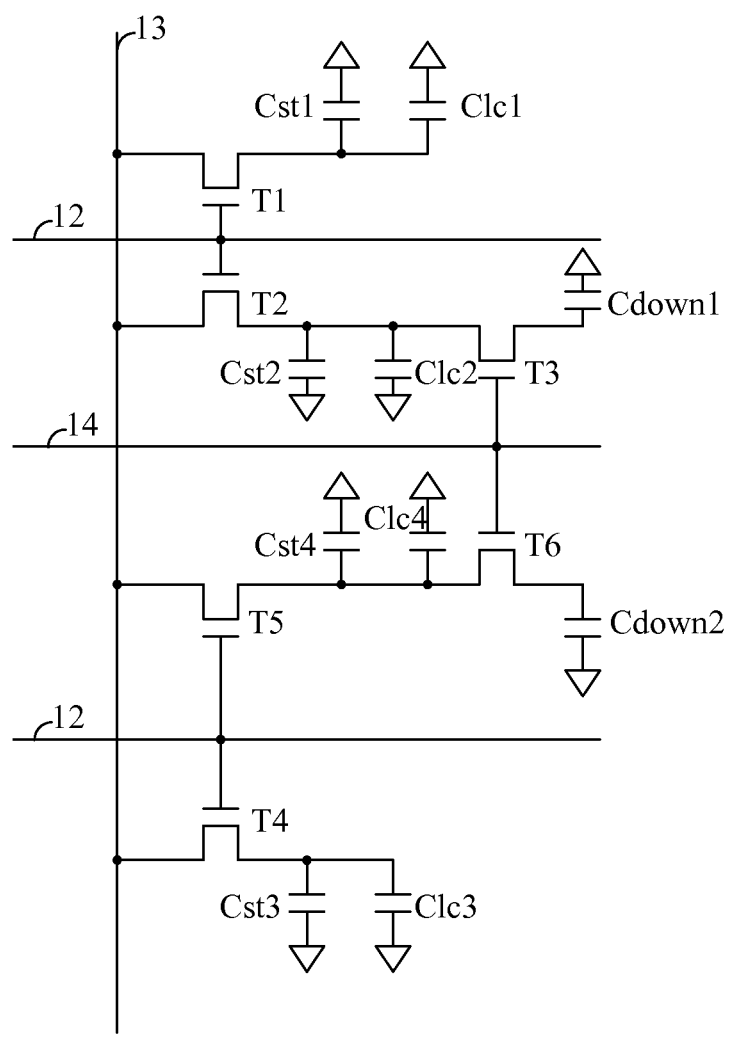
FIG. 2 is an equivalent circuit diagram showing two neighboring pixel units.

FIG. 2 is an equivalent circuit diagram showing two neighboring pixel units 15. As illustrated, the Nth main pixel unit 161 is equivalent to a liquid crystal capacitor Clc1 and a storage capacitor Cst1. The Nth sub pixel unit 171 is equivalent to a liquid crystal capacitor Clc2 and a storage capacitor Cst2. The Nth share capacitor 181 is represented by a capacitor Cdown1. The (N+1)th main pixel unit 162 is equivalent to a liquid crystal capacitor Clc3 and a storage capacitor Cst3. The (N+1)th sub pixel unit 172 is equivalent to a liquid crystal capacitor Clc4 and a storage capacitor Cst4. The (N+1)th share capacitor 182 is represented by a capacitor Cdown2.

When the Nth scan line 12 is turned on, the first and second TFTs T1 and T2 are conducted to each other. The Nth data line 13 charges the Nth main and sub pixel units 161 and 171. The Nth main and sub pixel units 161 and 171 have an identical voltage. In other words, the voltage across the liquid crystal capacitor Clc1 and the storage capacitor Cst1 is identical the voltage across the liquid crystal capacitor Cls2 and the storage capacitor Cst2.

When the (N+1)th scan line 12 is turned on, the fourth and fifth TFTs T4 and T5 are conducted to each other. The (N+1)th data line 13 charges the (N+1)th main and sub pixel units 162 and 172. The (N+1)th main and sub pixel units 162 and 172 have an identical voltage. In other words, the voltage across the liquid crystal capacitor Clc3 and the storage capacitor Cst3 is identical the voltage across the liquid crystal capacitor Cls4 and the storage capacitor Cst4.

When the Mth common scan line 14 is turned on, i.e., when the Mth common scan drives the Nth sub pixel unit 171 and the (N+1)th sub pixel unit 172 simultaneously, the third and sixth TFTs T3 and T6 are conducted to each other. The Nth sub pixel unit 171 is connected to the Nth share capacitor 181 via the third TFT T3. The Nth share capacitor 181 is for sharing the Nth sub pixel unit 171's voltage so as to reduce the Nth sub pixel unit 171's voltage. The Nth main pixel unit 161 has a greater voltage than that of the Nth sub pixel unit 171. At this moment, the liquid crystal molecules at the Nth main pixel unit 161 and those at the Nth sub pixel unit 171 are tilted differently. The (N+1)th sub pixel unit 172 is connected to the (N+1)th share capacitor 182 via the sixth TFT T6. The (N+1)th share capacitor 182 is for sharing the (N+1)th sub pixel unit 172's voltage so as to reduce the (N+1)th sub pixel unit 172's voltage. The (N+1)th main pixel unit 162 has a greater voltage than that of the (N+1)th sub pixel unit 172. At this moment, the liquid crystal molecules at the (N+1)th main pixel unit 162 and those at the (N+1)th sub pixel unit 172 are tilted differently. The array substrate 10 of the present embodiment therefore significantly enhances the color shift under large viewing angles.

The Mth common scan line 14 between the Nth pixel unit 151 and the (N+1)th pixel unit 152 is connected to a (N+n)th scan line 12 where n is an integer greater than or equal to 2. M is an integer greater than or equal to 1. M and N also satisfies the following relation:

$$M=(N+1)/2.$$

When N=1, M=1, meaning there is a first common scan line 14 between a first pixel unit 151 and a second pixel nit 152.

Preferably, n is equal to 2, meaning the Mth common scan line 14 is connected to a (N+2)th scan line 12. As the Nth scan line 12, the (N+1)th scan line 12, and the (N+2)th scan line 12 are turned on sequentially. Then, after the Nth and the (N+1)th scan lines 12 are turned off, the (N+2)th scan line 12 is turned on. In the meantime, the Mth common scan line 14 is also turned on so that the Mth common scan line 14 is turned on after the Nth pixel unit 151 and the (N+1)th pixel unit 152 are finished charging and turned off.

Please note that each pixel unit 15's pixel electrodes are ITO (Indium Tin Oxides).

By configuring the Nth sub pixel unit 171 and (N+1)th sub pixel unit 172 to be equally adjacent to the Mth common scan line 14, the Nth and (N+1)th sub pixel units 171 and 172 share the Mth common scan line 14, which drives the Nth and (N+1)th sub pixel units 171 and 172 simultaneously. The number of common scan lines 14 is as such reduced, thereby enhancing pixel aperture ratio and the array substrate 10's penetration and quality.

Figure 3:
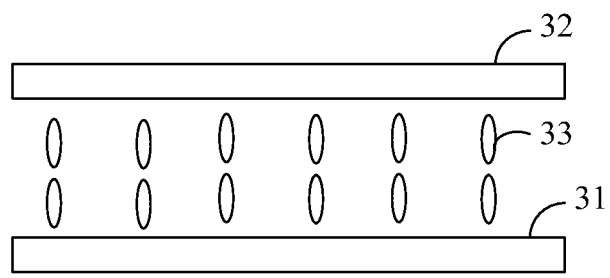
FIG. 3 is a schematic diagram showing a liquid crystal display panel according to an embodiment of the present invention.

The present invention also provides a liquid crystal display (LCD) panel based on the array substrate 10 described above. As shown in FIG. 3, a LCD panel 30 contains an array substrate 31, a color film substrate 32, and a liquid crystal layer 33 sandwiched between the array substrate 31 and the color film substrate 32. The array substrate 31 and the color film substrate 32 are positioned oppositely. The array substrate 31 is the array substrate 10 described above. Its details are omitted here.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. An array substrate comprising a substrate, a plurality of scan lines, data lines, and common scan lines, wherein
    the scan lines and the common scan lines are interleaved with the data lines on the substrate to form a plurality of pixel units;
    each pixel unit comprises a main pixel unit, a sub pixel unit, and a share capacitor;
    for each pair of neighboring pixel units, including a Nth pixel unit and a (N+1)th pixel unit, across a Mth common scan line, the Nth and (N+1)th pixel units are arranged along and to a side of a Nth data line the Nth pixel unit is located between a Nth scan line and the Mth common scan line; the (N+1)th pixel unit is located between the Mth common scan line and a (N+1)th scan line; their two sub pixel units share the Mth common scan line which drives the two sub pixel units simultaneously; and
    the Mth common scan line between the Nth pixel unit and the (N+1)th pixel unit is connected to a (N+n)th scan line where N is an odd integer greater than or equal to 1, n is an integer greater than or equal to 2, M is an integer greater than or equal to 1, and M=(N+1)/2.

2. The array substrate as claimed in claim 1, wherein the array substrate further comprises a plurality of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

3. An array substrate comprising a substrate, a plurality of scan lines, a plurality of data lines, and a plurality of common scan lines, wherein
the scan lines and the common scan lines are interleaved with the data lines on the substrate to form a plurality of pixel units;
each pixel unit comprises a main pixel unit and a sub pixel unit;
for each pair of neighboring pixel units across a common scan line, their two sub pixel units share the common scan line which drives the two sub pixel units simultaneously.

4. The array substrate as claimed in claim 3, wherein
each pair of neighboring pixel units is arranged along and to a side of a data line; and
each pixel unit further comprises a share capacitor.

5. The array substrate as claimed in claim 4, wherein, for each pair of neighboring pixel units, including a Nth pixel unit and a (N+1)th pixel unit across a Mth common scan line, the Nth pixel unit is located between a Nth scan line and the Mth common scan line, and the (N+1)th pixel unit is located between the Mth common scan line and a (N+1)th scan line, where N is an odd integer greater than or equal to 1, M is an integer greater than or equal to 1, and M=(N+1)/2.

6. The array substrate as claimed in claim 5, wherein the array substrate further comprises a plurality of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

7. The array substrate as claimed in claim 6, wherein the Mth common scan line between the Nth pixel unit and the (N+1)th pixel unit is connected to a (N+n)th scan line where n is an integer greater than or equal to 2.

8. The array substrate as claimed in claim 6, wherein the Mth common scan line between the Nth pixel unit and the (N+1)th pixel unit is connected to a (N+2)th scan line.

9. The array substrate as claimed in claim 6, wherein, when a Nth scan line is turned on, and a (N+1)th scan line and a (N+2)th scan line are turned off, a first TFT and a second TFT are conducted; a Nth data line charges a Nth main pixel unit and a Nth sub pixel unit; when the (N+1)th scan line is turned on, and the Nth scan line and the (N+2)th scan line are turned off, a fourth TFT and a fifth TFT are conducted; and a (N+1)th data line charges a (N+1)th main pixel unit and a (N+1)th sub pixel unit.

10. The array substrate as claimed in claim 9, wherein, when a (N+2)th scan line is turned off, and a Nth scan line and a (N+1)th scan line are turned off, a third TFT and a sixth TFT are conducted; a Nth sub pixel unit is connected to a Mth share capacitor; a (N+1) sub pixel unit is connected to the Mth share capacitor so as to reduce the voltage of the Nth and (N+1)th sub pixel units.

11. The array substrate as claimed in claim 3, wherein each pixel unit pixel has Indium Tin Oxide (ITO) electrodes.

12. A liquid crystal display panel comprising an array substrate wherein
the array substrate comprises a substrate, a plurality of scan lines, a plurality of data lines, and a plurality of common scan lines;
the scan lines and the common scan lines are interleaved with the data lines on the substrate to form a plurality of pixel units;
each pixel unit comprises a main pixel unit and a sub pixel unit;
for each pair of neighboring pixel units across a common scan line, their two sub pixel units share the common scan line which drives the two sub pixel units simultaneously.

13. The array substrate as claimed in claim 12, wherein
each pair of neighboring pixel units is arranged along and to a side of a data line; and
each pixel unit further comprises a share capacitor.

14. The array substrate as claimed in claim 13, wherein, for each pair of neighboring pixel units, including a Nth pixel unit and a (N+1)th pixel unit across a Mth common scan line, the Nth pixel unit is located between a Nth scan line and the Mth common scan line, and the (N+1)th pixel unit is located between the Mth common scan line and a (N+1)th scan line, where N is an odd integer greater than or equal to 1, M is an integer greater than or equal to 1, and M=(N+1)/2.

15. The array substrate as claimed in claim 14, wherein the array substrate further comprises a plurality of first thin film transistors (TFTs), second TFTs, third TFTs, fourth TFTs, fifth TFTs, and sixth TFTs; each first TFT has its gate connected to a Nth scan line, its source connected to a Nth data line, and its drain connected to a Nth main pixel unit; each second TFT has its gate connected to the Nth scan line, its source connected to the Nth data line, and its drain connected to a Nth sub pixel unit; each third TFT has its gate connected a Mth common scan line, its source connected to the Nth sub pixel unit, and its drain connected to a Nth share capacitor; each fourth TFT has its gate connected to a (N+1)th scan line, its source connected to the Nth data line, and its drain connected to a (N+1)th main pixel unit; each fifth TFT has its gate connected to the (N+1)th scan line, its source connected to the Nth data line, and its drain connected to a (N+1)th sub pixel unit; each sixth TFT has its gate connected to the Mth common scan line, its source connected to the (N+1)th sub pixel unit, and its drain connected to a (N+1)th share capacitor.

16. The array substrate as claimed in claim 15, wherein the Mth common scan line between the Nth pixel unit and the (N+1)th pixel unit is connected to a (N+n)th scan line where n is an integer greater than or equal to 2.

17. The array substrate as claimed in claim 15, wherein the Mth common scan line between the Nth pixel unit and the (N+1)th pixel unit is connected to a (N+2)th scan line.

18. The array substrate as claimed in claim 15, wherein, when a Nth scan line is turned on, and a (N+1)th scan line and a (N+2)th scan line are turned off, a first TFT and a second TFT are conducted; a Nth data line charges a Nth main pixel unit and a Nth sub pixel unit; when the (N+1)th scan line is turned on, and the Nth scan line and the (N+2)th scan line are turned off, a fourth TFT and a fifth TFT are conducted; and a (N+1)th data line charges a (N+1)th main pixel unit and a (N+1)th sub pixel unit.

19. The array substrate as claimed in claim 18, wherein, when a (N+2)th scan line is turned off, and a Nth scan line and a (N+1)th scan line are turned off, a third TFT and a sixth TFT are conducted; a Nth sub pixel unit is connected to a Mth share capacitor; a (N+1) sub pixel unit is connected to the Mth share capacitor so as to reduce the voltage of the Nth and (N+1)th sub pixel units.

20. The array substrate as claimed in claim 12, wherein each pixel unit pixel has Indium Tin Oxide (ITO) electrodes.

* * * * *